US011757262B1

(12) United States Patent
Lykowski et al.

(10) Patent No.: US 11,757,262 B1
(45) Date of Patent: Sep. 12, 2023

(54) PRECHAMBER SPARK PLUG AND METHOD OF MANUFACTURING THE SAME (71) Applicants: FEDERAL-MOGUL IGNITION LLC, Southfield, MI (US); FEDERAL-MOGUL IGNITION GMBH, Neuhaus-Schierschnitz (DE)

(72) Inventors: James D. Lykowski, Temperance, MI (US); Peter Janas-Habu, Duisburg (DE)

(73) Assignees: FEDERAL-MOGUL IGNITION GMBH, Neuhaus-Schierschni (DE); FEDERAL-MOGUL IGNITION LLC, Southfield, MI (US)

( * ) Notice: Subject to any disclaimer, the term of this patent is extended or adjusted under 35 U.S.C. 154(b) by 0 days.

(21) Appl. No.: 18/089,777

(22) Filed: Dec. 28, 2022

(51) Int. Cl.
*H01T 13/54* (2006.01)
(52) U.S. Cl.
CPC .................... *H01T 13/54* (2013.01)
(58) Field of Classification Search
CPC ...................................... H01T 13/54
USPC ........................................ 313/141
See application file for complete search history.

(56) References Cited

U.S. PATENT DOCUMENTS

| | | | |
|---|---|---|---|
| 1,870,981 A | 8/1932 | Auzin | |
| 2,153,598 A | 4/1939 | Steward | |
| 4,028,576 A | 6/1977 | Wofsey | |
| 4,509,476 A | 4/1985 | Breuser | |
| 6,597,088 B1 | 7/2003 | Glaser et al. | |
| 9,316,144 B2 | 4/2016 | Gruber | |
| 9,840,963 B2 | 12/2017 | Chiera et al. | |
| 10,109,986 B2 | 10/2018 | Niessner | |
| 10,658,818 B2 | 5/2020 | Niessner | |
| 10,833,485 B2 | 11/2020 | Niessner | |
| 11,183,818 B2 | 11/2021 | Niessner | |
| 11,552,456 B1 * | 1/2023 | Lykowski | H01T 13/06 |
| 2013/0214672 A1 | 8/2013 | Rohrbach et al. | |

(Continued)

FOREIGN PATENT DOCUMENTS

| | | |
|---|---|---|
| AT | 14789 U1 | 6/2016 |
| AT | 14789 U1 | 6/2016 |

(Continued)

*Primary Examiner* — Christopher M Raabe
(74) *Attorney, Agent, or Firm* — REISING ETHINGTON, P.C.

(57) ABSTRACT

A prechamber spark plug that includes an internal reservoir, a flow passage portion, and a prechamber and is designed to operate efficiently across a wide variety of operating conditions and ranges. The internal reservoir includes upper and lower internal reservoir sections, the prechamber includes upper and lower prechamber sections, and the flow passage portion fluidly connects the lower internal reservoir section and the upper prechamber section so that burnt air/fuel gases can be exchanged therebetween. A ground electrode assembly with a ground electrode ring may be positioned in the prechamber such that it separates the upper and lower prechamber sections, whereas a modular prechamber cap may be used to define the shape and size of the lower prechamber section. In one example, the flow passage portion has a total cross-sectional area (AFC) and the internal reservoir has a total volume (VRES), and the ratio AFC:VRES is greater than or equal to 0.015 (1/mm).

20 Claims, 5 Drawing Sheets

(56) References Cited

U.S. PATENT DOCUMENTS

| | | |
|---|---|---|
| 2015/0028737 A1 | 1/2015 | Alfonso |
| 2018/0123323 A1 | 5/2018 | Kobayashi et al. |
| 2020/0080466 A1 | 3/2020 | Anderson et al. |
| 2020/0358260 A1 | 11/2020 | Gozawa |
| 2021/0021105 A1 | 1/2021 | Kawata et al. |
| 2021/0203135 A1 | 7/2021 | Shibata et al. |
| 2021/0249846 A1 | 8/2021 | Tanahashi et al. |
| 2022/0120210 A1 | 4/2022 | Puschnik et al. |

FOREIGN PATENT DOCUMENTS

| | | |
|---|---|---|
| AT | 520987 A1 | 9/2019 |
| AT | 522050 A1 | 8/2020 |
| AT | 522438 A4 | 11/2020 |
| AT | 523273 A1 | 7/2021 |
| CN | 2532249 Y | 1/2003 |
| CN | 111577445 A | 8/2020 |
| DE | 3025896 A1 | 2/1982 |
| DE | 3230793 A1 | 2/1984 |
| DE | 112018006619 A5 | 9/2020 |
| DE | 102020110960 A1 | 10/2020 |
| DE | 102020202385 A1 | 3/2021 |
| DE | 102020213028 A1 | 4/2021 |
| DE | 102021109337 A1 | 10/2021 |
| EP | 1701419 A1 | 9/2006 |
| GB | 1370762 A | 10/1974 |
| JP | 2016004730 A | 1/2016 |
| WO | WO0150017 A1 | 7/2001 |
| WO | WO2014191085 A1 | 12/2014 |
| WO | WO2019126838 A1 | 7/2019 |

\* cited by examiner

PRECHAMBER SPARK PLUG AND METHOD OF MANUFACTURING THE SAME

FIELD

The present disclosure generally relates to a spark plug and, in particular, to a prechamber spark plug for an internal combustion engine.

BACKGROUND

Prechamber (i.e., pre-combustion chamber) spark plugs are typically used to enhance the combustion characteristics and efficiency of internal combustion engines. Generally, for a passive prechamber spark plug, there is no active component or means to actively introduce or remove fresh air, fuel, or residual gases except a communication with a main combustion chamber via openings of a prechamber cap.

During a compression stroke of an engine, fuel-air mixture must be led into the prechamber of the prechamber spark plug in such a way that there is an ignitable mixture at a spark gap. Due to subsequent combustion and the pressure increase resulting therefrom, torches escape through the openings of the prechamber cap and ignite the fuel-air mixture in the main combustion chamber of the engine. However, in some cases, some of the residual gases in the prechamber are not completely flushed out and can remain within the prechamber during exhaust and intake strokes. A pressure difference between the main combustion chamber and the prechamber can increase to force a fresh charge through the openings into the prechamber. Pressurizing the fresh charge into the prechamber can compress the residual gases towards the spark plug. The residual gases trapped in the prechamber can lead to pre-ignition, engine misfire, and/or abnormal combustion, especially when the engine is operating in richer lambda (air/fuel ratio) ranges.

Moreover, when the spark plug gets too hot, an uncontrolled ignition can occur in the main combustion chamber prior to an ignition point. This can increase the risk of engine damage. Pre-ignition in the prechamber of the spark plug not only increases the temperatures of the various spark plug components such as a ground electrode, a center electrode, an insulator base, or the prechamber cap, but can also lead to pre-ignition in the main combustion chamber. One of the ways to prevent self-ignition and/or pre-ignition in the prechamber is to increase the volume and/or internal surface area of the prechamber. However, the volume of the prechamber cannot be increased by simply increasing a diameter of the prechamber as it is limited by specified engine geometry. Further, increased volume of the prechamber can result in an unbalanced ratio of a lower chamber volume to an upper chamber volume within the prechamber spark plug. This can reduce the movement of a fresh charge into a spark gap area within the prechamber, thereby causing poor combustion in the prechamber and a narrow operating range of the engine.

Some conventional methods to overcome the aforementioned issues include providing a secondary prechamber insert in addition to a conventional spark plug. The geometry of a secondary prechamber insert may be chosen such that an additional upper chamber volume can be externally created and a balanced ratio of the lower chamber volume to the upper chamber volume within the prechamber spark plug can be achieved. However, introducing the secondary prechamber insert can cause space constraints and increase an overall manufacturing cost and complexity of the engine. Another conventional technique involves tuning a prechamber spark plug to provide optimum combustion performance over a narrow operating range and add a completely separate secondary spark plug within the combustion chamber. The secondary spark plug provides ignition in the combustion chamber when ignition in the prechamber spark plug is ineffective. However, introducing the secondary spark plug can again cause space constraints and increase the overall manufacturing cost and complexity of the engine.

SUMMARY

According to one embodiment, there is provided a prechamber spark plug, comprising: a center electrode assembly; an insulator including an axial bore, the center electrode assembly is at least partially accommodated within the insulator axial bore; a shell including an axial bore, the insulator is at least partially accommodated within the shell axial bore; a ground electrode assembly, the ground electrode assembly forms one or more spark gap(s) with the center electrode assembly and is attached to the shell; an internal reservoir, the internal reservoir is a space that is disposed radially between the insulator and the shell and is configured to receive residual exhaust gases; a flow passage portion including one or more projection(s), the flow passage portion is in fluid communication with the internal reservoir and is configured to affect a flow of the residual exhaust gases into and/or out of the internal reservoir; a prechamber, the prechamber is in fluid communication with the flow passage portion and a main combustion chamber, the prechamber surrounds the spark gap(s) and is configured to exchange fresh air/fuel gases and the residual exhaust gases with the main combustion chamber; and a prechamber cap including one or more opening(s), the prechamber cap is attached to the shell.

In accordance with the various embodiments, the prechamber spark plug may have any one or more of the following features, either singly or in any technically feasible combination:
  the insulator includes a terminal end, an enlarged section, a reduced section, a core nose section, and a free end; the enlarged section is located between the terminal end and the reduced section; the reduced section is located between the enlarged section and the free end; the core nose section is located between the reduced section and the free end; a first insulator exterior shoulder is formed at a transition between the enlarged section and the reduced section, the first insulator exterior shoulder is supported on an annular internal seal which, in turn, is supported on a first shell interior shoulder; and a second insulator exterior shoulder is formed at a transition between the reduced section and the core nose section, the second insulator exterior shoulder is not supported on an annular seal or a shell interior shoulder such that it is an unsupported shoulder, and the unsupported shoulder helps establish a thermal pathway for residual exhaust gases through the annular internal seal and the first shell interior shoulder which are in the area of an upper internal reservoir section;
  the core nose section includes an exterior surface that is slightly concaved such that a small pocket is formed that can affect a flow of residual and/or other gases in an upper prechamber section;
  the shell includes a crimped end, an enlarged section, a reduced section, and a prechamber cap end; the enlarged section is located between the crimped end and the reduced section; the reduced section is located between the enlarged section and the prechamber cap end and includes threads for installation in an engine, the reduced section has a long reach with a large axial length F that is at least 19 mm; and a shell exterior shoulder is formed at a transition between the enlarged section and the reduced section, and the shell exterior shoulder is designed to compress an annular external gasket between the shell exterior shoulder and a part of the engine when the prechamber spark plug is installed in the engine;

the ground electrode assembly includes a ground electrode ring, one or more ground electrode attachment piece(s), and one or more ground electrode tips; the ground electrode ring is attached to the interior surface of the shell axial bore and includes one or more recess(es); the ground electrode attachment piece(s) are received in the recess(es) and extend in a generally radially inward manner from the ground electrode ring towards the center electrode tip; and the ground electrode tip(s) are attached to the ground electrode attachment piece(s) and form spark gap(s) with the center electrode assembly, and the ground electrode tip(s) include a precious metal-based material;

the ground electrode ring includes a slight annular taper on an outer diameter surface to ease insertion of the ground electrode ring into the shell axial bore, and the ground electrode assembly includes one or more small gap(s) between axial end surface(s) of the ground electrode attachment piece(s) and an inner diameter surface of the shell axial bore;

the internal reservoir includes an upper internal reservoir section and a lower internal reservoir section; the upper internal reservoir section is generally an annular space that is in fluid communication with the lower internal reservoir section; and the lower internal reservoir section is generally a cylindrical space that is in fluid communication with both the upper internal reservoir section and the flow passage portion;

the upper internal reservoir section is at least partially bounded or defined by: an annular internal seal on an upper axial side, a second shell interior shoulder on a lower axial side, an exterior surface of the insulator on an inner radial side, and the interior surface of the shell axial bore on an outer radial side, the upper internal reservoir section is shorter in axial length and is wider in radial width than the lower internal reservoir section;

at least part of the upper internal reservoir section is located directly adjacent an enlarged section of the shell, which is in contact with an annular external gasket such that, when the prechamber spark plug is installed in an engine, a thermal pathway is established that transfers thermal energy from hot residual exhaust gases in the upper internal reservoir section to the shell enlarged section, and from the shell enlarged section to the engine via the annular external gasket;

the lower internal reservoir section is at least partially bounded or defined by: a second shell interior shoulder on an upper axial side, the flow passage portion on a lower axial side, an exterior surface of the insulator on an inner radial side, and the interior surface of the shell axial bore on an outer radial side;

the projection(s) of the flow passage portion have a configuration that is selected from the group consisting of: the projection(s) are integrally formed with the shell and project radially inwards toward the insulator, the projection(s) are integrally formed with the insulator and project radially outwards toward the shell, some of the projection(s) are integrally formed with the shell and project radially inwards toward the insulator while other projection(s) are integrally formed with the insulator and project radially outwards toward the shell, or the projection(s) are part of a separate sleeve component that fits radially between the insulator and the shell;

the projection(s) are integrally formed with the shell and project radially inwards toward the insulator, the flow passage portion further includes one or more small gap(s), each small gap is located radially between an opposing surface of a projection and an exterior surface of the insulator such that the projection and the insulator do not contact one another at that small gap;

the projection(s) of the flow passage portion are part of a separate sleeve component that is at least partially located between the shell and the insulator and extends axially so as to also be part of the ground electrode assembly;

the flow passage portion is at least partially bounded or defined by: a lower internal reservoir section on an upper axial side, an upper prechamber section on a lower axial side, an exterior surface of the insulator on an inner radial side, and the interior surface of the shell axial bore on an outer radial side, the projection(s) of the flow passage portion help center the insulator within the axial bore of the shell such that a uniform radial spacing is maintained in the flow passage portion;

the flow passage portion has a total cross-sectional area (AFC) measured in $mm^2$ and the internal reservoir has a total volume (VRES) measured in $mm^3$, and the ratio AFC:VRES is greater than or equal to 0.015 (1/mm);

the flow passage portion has a total cross-sectional area (AFC) measured in $mm^2$ and the opening(s) in the prechamber cap have a total cross-sectional area (AHMAX) measured in $mm^2$, and the ratio AFC:AHMAX is greater than or equal to 0.30;

the prechamber includes an upper prechamber section and a lower prechamber section; the upper prechamber section is a space that is located axially above the ground electrode assembly and is in fluid communication with both the flow passage portion and the lower prechamber section; and the lower prechamber section is a space that is located axially below the ground electrode assembly and is in fluid communication with both the upper the upper prechamber section and a main combustion chamber;

the ground electrode assembly is freely positioned with the shell axial bore; and the ground electrode assembly and the shell axial bore are configured so that, during manufacture, an axial position of the ground electrode assembly can be adjusted by sliding the ground electrode assembly within the shell axial bore before attachment and a circumferential position of the ground electrode assembly can be adjusted by rotating the ground electrode assembly within the shell axial bore before attachment.

According to another embodiment, there is provided a method of manufacturing a prechamber spark plug. The prechamber spark plug comprises: a center electrode assembly; an insulator including an axial bore, the center electrode assembly is at least partially accommodated within the insulator axial bore; a shell including an axial bore and a prechamber cap end, the insulator is at least partially accommodated within the shell axial bore; a ground electrode assembly; an internal reservoir, the internal reservoir is a space that is disposed radially between the insulator and the shell; a flow passage portion including one or more projection(s), the flow passage portion is in fluid communication with the internal reservoir; a prechamber, the prechamber is in fluid communication with the flow passage portion and a main combustion chamber; and a prechamber cap including one or more opening(s), the prechamber cap is attached to the shell. The method comprises the steps of: inserting the ground electrode assembly into the shell axial bore from the prechamber cap end so that the ground electrode assembly is freely positioned within the shell axial bore; adjusting the ground electrode assembly within the shell axial bore in terms of at least one of its axial position and/or its circumferential position; and attaching the ground electrode assembly to the shell when a desirable axial position and/or circumferential position is set.

DRAWINGS

Preferred embodiments will hereinafter be described in conjunction with the appended drawings, wherein like designations denote like elements, and wherein.

DESCRIPTION

The prechamber spark plug disclosed herein is a passive spark plug that includes an internal reservoir, a flow passage portion, and a prechamber and is designed to operate efficiently across a wide variety of operating conditions and ranges. According to one embodiment, the internal reservoir includes upper and lower internal reservoir sections, the prechamber includes upper and lower prechamber sections, and the flow passage portion fluidly connects the lower internal reservoir section and the upper prechamber section so that burnt air/fuel gases can be exchanged therebetween. A ground electrode assembly with a ground electrode ring may be positioned in the prechamber such that it separates the upper and lower prechamber sections, whereas a modular prechamber cap may be used to define the shape and size of the lower prechamber section. Unlike many conventional prechamber spark plugs that struggle to operate efficiently in certain operating conditions, the prechamber spark plug of the present application is able to work well across a variety of such conditions, including those associated with high exhaust gas recirculation (EGR).

The prechamber spark plug disclosed herein may be used in a wide variety of applications including those associated with automotive spark plugs, industrial spark plugs, aviation igniters, glow plugs, or any other application where an air/fuel mixture is ignited in an engine or other piece of machinery. The present prechamber spark plug, however, is particularly well suited for automotive applications, such as M10-M14 size applications. Other embodiments are certainly possible, such as those with different axial, radial and/or semi-creeping or surface spark gaps; multiple center and/or ground electrode configurations; as well as plugs that burn or ignite gasoline, diesel, natural gas, ethanol, hydrogen, propane, butane, etc., as well as any suitable blend thereof. The prechamber spark plug of the present application is in no way limited to the illustrative examples shown and described herein. Unless otherwise specified, such as the case with area and/or volume percentages, all percentages provided herein are in terms of weight percentage (wt %) and all references to axial, radial and circumferential directions are based on the center axis A of the spark plug.

Figure 1:
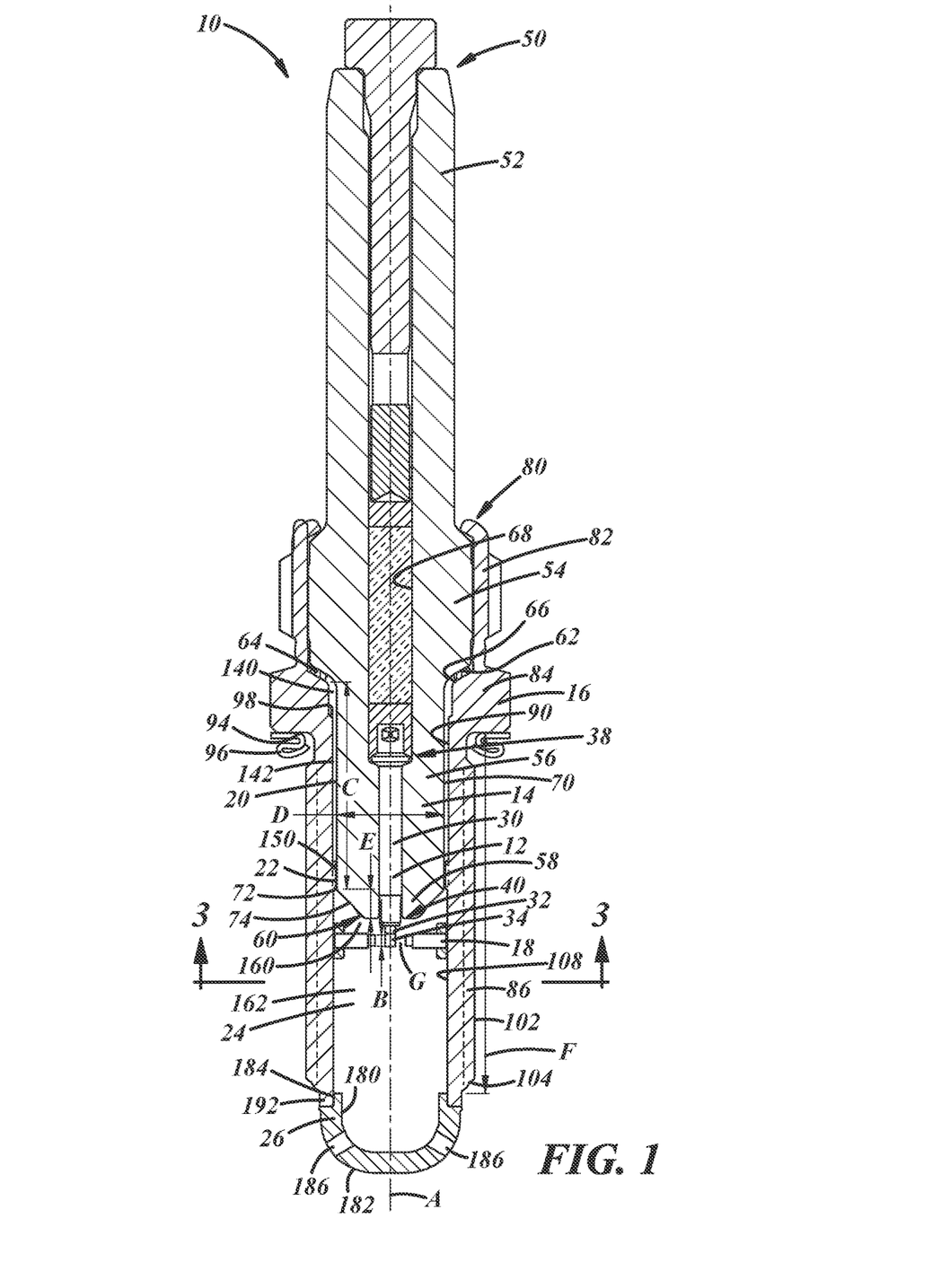
FIG. 1 is a cross-sectional view of a first example of a prechamber spark plug having an internal reservoir, a flow passage portion, and a prechamber.

Referring to FIG. 1, there is shown an example of a prechamber spark plug that is designed for efficient performance across a wide range of operating conditions. The prechamber spark plug 10 includes a center electrode assembly 12, an insulator 14, a metallic shell 16, a ground electrode assembly 18, an internal reservoir 20, a flow passage 22, a prechamber 24, and a prechamber cap 26. According to the illustrated embodiment, prechamber spark plug 10 is a "passive" prechamber spark plug, which means that, except for flow passage portion 22, the internal reservoir 20 is a closed chamber that is fluidly sealed off from its surroundings. This is different than an "active" prechamber spark plug, where one or more fluid passageways connect to an external reservoir or device and deliver fluids to (e.g., fuel, additives, fresh air, etc.) and/or remove fluids from (e.g., exhaust gases, etc.) the internal prechamber or reservoir. It is possible, however, for the prechamber spark plug disclosed herein to be modified and used as an active prechamber spark plug.

The center electrode assembly 12 is at least partially disposed within an axial bore of the insulator 14 and may include a center electrode base 30, a center electrode intermediate piece 32, and/or a center electrode tip 34. The center electrode base 30 is preferably made of a nickel-based material or alloy for oxidation resistance, such as Inconel 600 or 601, and it extends from an enlarged end 38 seated on a complementarily-shaped interior shoulder within the insulator axial bore to a firing end 40 that connects to the intermediate piece 32. It is possible for the center electrode base 30 to have one or more diametrically-reduced or neck-down sections, as shown, as well as one or more thermally conductive cores for removing heat away from the firing end 40. The center electrode intermediate piece 32, which is optional and could be omitted, is designed to facilitate or improve the connection between the center electrode base 30 and tip 34. To do so, the center electrode intermediate piece 32 may be made of a nickel-based material with a coefficient of thermal expansion (CTE) that is between that of the center electrode base 30 and the tip 34. The center electrode tip 34, on the other hand, is preferably made from a precious metal-based material, such as iridium-, platinum-, ruthenium- palladium- and/or rhodium-based materials, to cite a few possibilities. According to one non-limiting example, center electrode tip 34 has an axial length B from 0.4 mm-2.0 mm, inclusive, or even more preferably from 0.6 mm-1.6 mm, inclusive, and is made from an iridium-based material (e.g., Ir—Pt alloy, Ir—Rh alloy, Ir—Pt—Rh alloy, etc.) or a platinum-based material (e.g., a Pt—Ir alloy, Pt—Rh alloy, Pt—Ir—Rh alloy). A substantial axial length of the center electrode tip 34 may be needed in order to provide an adequate sparking surface for the opposing ground electrode(s). It is possible for the center electrode tip 34 to first be welded (e.g., laser welded) to the center electrode intermediate piece 32 to form a premanufactured multi-piece rivet, after which the intermediate piece 32 of the multi-piece rivet can be welded (e.g., resistance welded) to the center electrode body 30. This is not necessary, however, as the center electrode assembly 12 could just have an electrode body 30 (i.e., no intermediate piece, no tip), could have an electrode body 30 and a precious metal-based tip 34 (i.e., no intermediate piece), or it could have one or more intermediate pieces 32. Other embodiments are certainly possible.

Figure 2:
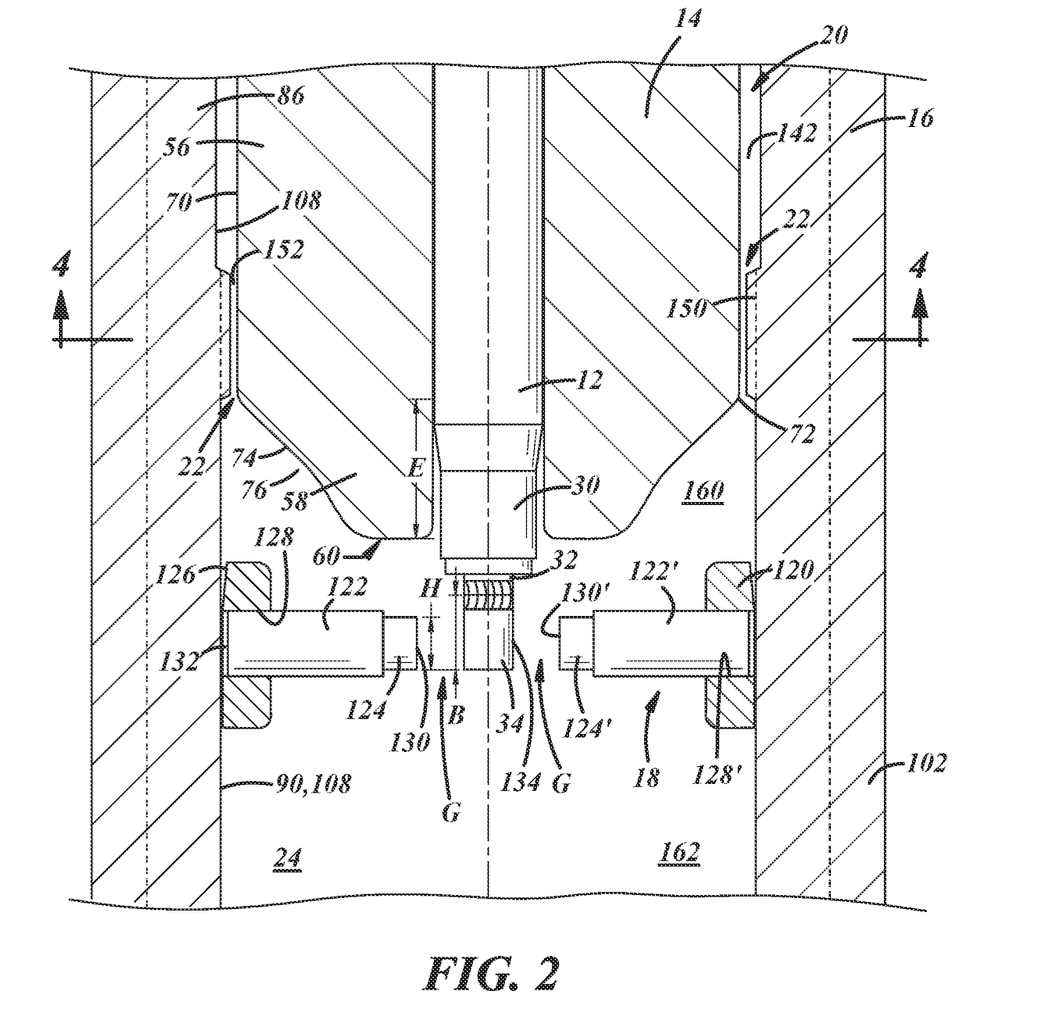
FIG. 2 is an enlarged cross-sectional view of a portion of the prechamber spark plug of FIG. 1, where the portion shows a spark gap established between a center electrode assembly and a ground electrode assembly.

The insulator 14 is at least partially disposed within an axial bore of the shell 16 and may include a terminal end 50, a terminal end section 52 located near the terminal end 50, an enlarged section 54, a reduced section 56, a core nose section 58 located near a free end 60, and an axial bore 68. As its name suggests, insulator 14 is constructed from a material, such as a ceramic material, that is sufficient to electrically insulate the center electrode 12 from the metallic shell 16 and has sufficient thermal properties to withstand combustion temperatures. The enlarged section 54 is at least partially surrounded by the shell 16 and is diametrically enlarged, compared to the reduced section 56, such that an exterior shoulder 62 is formed at the transition between the two sections. The exterior shoulder 62 rests on an annular internal seal 64, which in turn is supported by a complementary interior shoulder 66 of the shell. The reduced section 56 is located below the exterior shoulder 62 and it has an exterior surface 70 that at least partially defines or forms the interior reservoir 20, as will be described in more detail. When designing the prechamber spark plug 10, the axial length and/or the diametrical width of the reduced section 56 may be selected as a function of the desired interior reservoir volume, as the length and/or width of reduced section 56 can impact the overall volume of the interior reservoir 20 (e.g., the longer the length, the greater the interior reservoir volume, and the smaller the width the greater the interior reservoir volume). According to one non-limiting example, the reduced section 56 has an axial length C from 8 mm-22 mm, inclusive, or even more preferably an axial length C from 12 mm-18 mm, inclusive, and the reduced section 56 has an outer diametrical width D from 13 mm-5 mm, inclusive, and even more preferably from 11 mm-6 mm, inclusive. The width D of the reduced section 56 may be uniform along the length C so that the exterior surface 70 is straight and parallel to the longitudinal axis A (i.e., not tapered, with respect to axis A). However, in a different embodiment, the width D could vary such that the exterior surface 70 tapers, thus causing the interior reservoir volume to either increase or decrease along its axial length. An exterior shoulder 72 is formed at the transition between the reduced section 56 and the core nose section 58, but exterior shoulder 72 does not need to rest on any complementary interior shoulder of the shell 16 and, thus, may be an unsupported shoulder. The core nose section 58 is located below the unsupported exterior shoulder 72 and has an exterior surface 74 that at least partially defines or forms an upper section of the prechamber 24. As best seen in FIG. 2, the exterior surface 74 may be slightly concaved so as to form a small pocket 76 that can affect the flow of residual and/or other gases in the upper prechamber section, as will be described. According to the non-limiting example in FIG. 1, the core nose section 58 is a shortened core nose section with a small axial length E from 2 mm-10 mm, inclusive, or even more preferably from 3 mm-7 mm, inclusive. The core nose section 58 may terminate in a rounded or blunted free end 60, although other shapes and sizes are certainly possible.

The metallic shell 16 may include a crimped end 80, an engagement section 82 located near the crimped end 80, an enlarged or barrel section 84, a reduced or threaded section 86 that terminates near a prechamber cap end 88, and an axial bore 90. The metallic shell 16 is, as its name states, made of a metal material, such as steel, and it is designed to hold the other components of the spark plug and to screw into a threaded bore in the engine cylinder head, as is known in the art. The crimped end 80 is crimped or mechanically swaged over top of a corresponding exterior shoulder of the insulator 14 so that the shell and insulator can be firmly secured together. The engagement section 82 typically includes exterior features, such as a hex or the like, that can be engaged by a tool for torquing the spark plug 10 into the cylinder head. The enlarged section 84, sometimes referred to as a barrel or barrel section, may be located below the engagement section 82 and is diametrically enlarged compared to the adjacent shell sections above and/or below it. An exterior shoulder 94 is provided towards a lower end of the enlarged section 84 that, when the spark plug is installed in the engine, compresses an annular external gasket 96 between the exterior shoulder and the cylinder head. The annular external gasket 96 may be made from a suitable material, such as steel or copper, and may be folded or unfolded, depending on the application. The shell interior shoulder 66, mentioned above, is formed in the axial bore 90 at or near the transition between the engagement section 82 and the enlarged section 84 and supports annular internal seal 64 and insulator exterior shoulder 62. An additional interior shoulder 98 may also be formed in the axial bore 90, but does not support a corresponding section of the insulator; rather, the interior shoulder 98 helps define a lower boundary of an upper internal reservoir section, as will be explained. The reduced section 86 of the shell, also called the threaded section, is located below the enlarged section 84 and axially extends between the enlarged section 84 and the prechamber cap end 88. The reduced section 86 is generally diametrically reduced, compared to the enlarged or barrel section 84, and includes threads 102 and a thread start 104 on its exterior surface. In the example illustrated in FIG. 1, the spark plug has a rather long reach, which means that the threaded section has an axial length F that is at least 19 mm, and more preferably from 19 mm-27 mm, inclusive. An interior surface 108 of the reduced section 86 extends along the axial bore 90 and at least partially defines or forms the prechamber 24 and/or the internal reservoir 20. Although not shown in FIG. 1, it is possible for the interior surface 108 to include one or more additional interior shoulder(s) for supporting the core nose section 58 and/or other components. Skilled artisans will appreciate that various shell seal technologies may be used, including so-called "hot lock" and "sillment cold press" technologies, and that the prechamber spark plug disclosed herein is not limited to any particular type.

Figure 3:
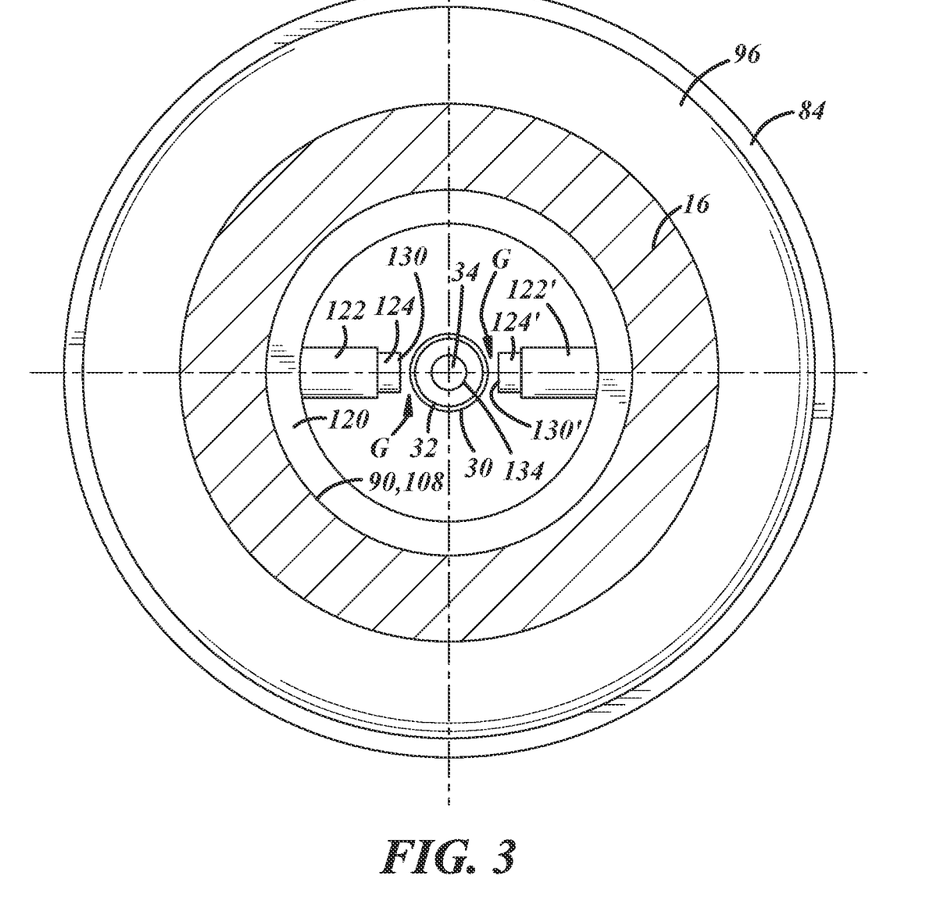
FIG. 3 is a cross-sectional view of the prechamber spark plug of FIG. 1 taken along line 3-3 in FIG. 1.

The ground electrode assembly 18 is located within the axial bore 90 and, in conjunction with the center electrode assembly 12, forms one or more spark gap(s) G. Turning now to FIGS. 2 and 3, there are shown several enlarged views of examples of a ground electrode assembly 18 that includes a ground electrode ring 120, several ground electrode attachment pieces 122, 122', and several ground electrode tips 124, 124'. The ground electrode ring 120 is an annular component that is designed to both attach to the interior surface 108 of the shell axial bore 90 and also carry or support the ground electrode attachment pieces 122, 122'. In order to reduce thermal and other stresses on a weld that attaches the ground electrode ring 120 to the interior surface 108, the ground electrode ring is preferably made of the same material as the shell, such as steel. The ground electrode ring 120 may also have several recesses or holes 128, 128' that are sized and shaped to receive the attachment pieces 122, 122', which may be made of a nickel-based material like Ni-200. The ground electrode attachment pieces 122, 122' extend in a radially inward manner from the ground electrode ring 120 towards the center electrode tip 34, as best illustrated in FIG. 3. The ground electrode attachment pieces 122, 122' may be laser or otherwise welded to the ground electrode ring 120, and the ground electrode tips 124, 124' may be respectively welded and/or otherwise attached (e.g., additive manufactured or 3D printed) to ends of the ground electrode attachment pieces 122, 122'. Ground electrode tips 124, 124' are preferably made from a precious metal-based material, such as iridium-, platinum-, ruthenium- palladium- and/or rhodium-based materials, to cite a few possibilities. In order to improve the manufacturing process, a slight annular taper 126 may be added to the outer diameter surface of the ground electrode ring 120 and a small gap or recess 132 may be established between an axial end surface of the ground electrode attachment pieces 122, 122' and the interior surface 108 of the shell axial bore 90. Taper 126 eases insertion of the ground electrode ring 120 from the bottom into the shell axial bore 90 during assembly in order to establish a press fit, and gap 132 provides some clearance so that weld material from the attachment of pieces 122, 122' to ring 120 does not become larger than the outer diameter of the ring and, thereby, obstruct insertion of the ring into the shell axial bore. The preceding features may be beneficial when there is a minimal press-fit clearance between the outer diameter of the ground electrode ring 120 and the inner diameter of the shell axial bore 90 (e.g., a clearance of around 0.04 mm). According to one non-limiting example, ground electrode tips 124, 124' are cylindrical, have a diameter H from 0.2 mm-1.2 mm, inclusive, or even more preferably from 0.4 mm-0.8 mm, inclusive, and are made from a platinum-based material (e.g., a Pt—Ir alloy like Pt-5Ir, a Pt—Rh alloy, a Pt—Ir—Rh alloy, etc.). It should be pointed out that the ground electrode assembly 18 is not limited to having two ground electrode tips 124, 124', as the assembly could have a single ground electrode attachment piece 122 and tip 124, or it could have three or more ground electrode attachment pieces and tips.

In different embodiments of the ground electrode assembly, the attachment piece(s) 122, 122' could be omitted such that the tip(s) 124, 124' are directly attached to the ground electrode ring, or the tip(s) 124, 124' could be omitted such that the attachment piece(s) 122, 122' form the spark gap(s). In yet another embodiment, the ground electrode ring could be omitted altogether such that the ground electrode assembly simply includes one or more ground electrode attachment piece(s) and/or tip(s) that are attached in holes in the shell 16. In this arrangement, sometimes referred to as a "push pin" design, the ground electrode attachment piece(s) may be inserted through chamfered holes in the shell reduced section 86 and welded in place such that they radially extend toward the center electrode assembly 12. It is possible for the ground electrode attachment piece(s) and/or tip(s) to be cylindrical, as they are in FIG. 2, or they can be tapered or some other suitable shape. In terms of the spark gaps G, each gap may be formed between an axial end surface 130, 130' of a ground electrode tip and a side surface 134 of the center electrode tip, and each gap is preferably between 0.35 mm-1.0 mm, inclusive, or more preferably between 0.6 mm-0.7 mm, inclusive, although this is not mandatory.

The internal reservoir 20 is disposed between an outer surface of the insulator 14 and an inner surface of the shell 16 and is designed to receive and manage residual exhaust gases, such as those left over from the previous combustion cycle, so that a fresh air/fuel charge can be present in the spark gap(s) G at the time of ignition. In this regard, the size, shape and/or location of the internal reservoir 20 may be adjusted, at the design phase, to accommodate certain engine design parameters and/or expected operating conditions. The internal reservoir 20 may include an upper internal reservoir section 140 and a lower internal reservoir section 142.

The upper internal reservoir section 140 is an annular or ring-shaped space or volume that is in fluid communication with the lower internal reservoir section 142. According to one example, the upper internal reservoir section 140 is at least partially bounded or defined by the annular internal seal 64 on an upper axial side, the shell interior shoulder 98 on a lower axial side, the exterior surface 70 of insulator reduced section 56 on an inner radial side, and the interior surface 108 of shell enlarged section 84 on an outer radial side. As can be seen in the drawings, the upper internal reservoir section 140 may be both shorter in axial length and wider in radial width than the lower internal reservoir section 142. The upper internal reservoir section 140, according to one example, is at least partially axially located between the annular internal seal 64 (internal seal) and the annular external gasket 96 (external seal). The size, shape and/or location of the upper internal reservoir section 140 can help with the thermal management of the spark plug. To explain, the area near the upper internal reservoir section 140 is a significant thermal pathway for transferring heat from the spark plug to the engine. By having the upper internal reservoir section 140 located directly adjacent the shell enlarged section 84, a substantial amount of thermal energy can be transferred from the hot residual exhaust gases that are pushed up into the upper internal reservoir section 140 to the shell enlarged section 84, from which the thermal energy can be transferred to the cylinder head of the engine via the annular external gasket 96. It is possible, however, for the upper internal reservoir section to be provided according to other embodiments, including ones having an active prechamber design where one or more fluid passageways connect to the internal reservoir 20 (e.g., a fluid passageway could be formed through shell enlarged section 84), ones having an interior shoulder 98 that more gradually blends into the lower internal reservoir section 142 as opposed to having a pronounced shoulder or step, ones with no interior shoulder 98 at all, and ones that have material removed from the shell enlarged section 84 and/or the insulator reduced section 56 in order to increase the radial width, and hence the volume, of the upper internal reservoir section 140, to cite just a few possibilities. The volume of the upper internal reservoir section 140 should be large enough to sufficiently accommodate residual exhaust gases that become compressed therein.

The lower internal reservoir section 142 is in fluid communication with both the upper internal reservoir section 140 and the flow passage portion 22. In one example, the lower internal reservoir section 142 is a cylindrical or sleeve-shaped space or volume that is at least partially bounded or defined by the shell interior shoulder 98 on an upper axial side, the flow passage portion 22 on a lower axial side, the exterior surface 70 of insulator reduced section 56 on an inner radial side, and the interior surface 108 of shell reduced section 86 on an outer radial side. A majority of the lower internal reservoir section 140, according to one example, is axially located between the annular external gasket 96 (external seal) and core nose section 58. The size, shape and/or location of the lower internal reservoir section 142 can help with the thermal management of the spark plug, such as by promoting the movement of residual exhaust gases to and from the upper internal reservoir section 140. Of course, other embodiments, such as ones where the lower internal reservoir section 142 is axially longer or shorter or is radially wider or narrower than that shown here, or where the cross-sectional area and/or volume of the lower internal reservoir section 142 varies along its axial length, are also possible.

The flow passage portion 22 is in fluid communication with both the lower internal reservoir section 142 and an upper prechamber section 160 and is designed to manage the flow of residual exhaust gases into and out of the internal reservoir 20, as well as to help center the insulator 14 within the axial bore 90 of the shell so that it has a more uniform radial spacing. According to the exemplary embodiment shown in FIGS. 2 and 4, the flow passage portion 22 is a circumferentially extending feature that is at least partially bounded by the lower internal reservoir section 142 on an upper axial side, the upper prechamber section 160 on a lower axial side, the insulator reduced section 56 on an inner radial side, and the shell reduced section 86 on an outer radial side. Instead of creating a significant thermal pathway to shell 16 in the vicinity of exterior shoulder 72, which could happen if that exterior shoulder was physically supported on the shell so that it could directly transfer thermal energy thereto, the unsupported exterior shoulder 72 allows thermal energy or heat associated with the residual exhaust gases to be conveyed through flow passage portion 22 and flow up into the upper internal reservoir section 140 where a more efficient and/or significant thermal pathway can be established through seal 64, enlarged section 84, and gasket 96. In this sense, the unsupported exterior shoulder 72 helps establish a significant thermal pathway in the area of the upper internal reservoir section 140, which may be desirable.

Figure 4:
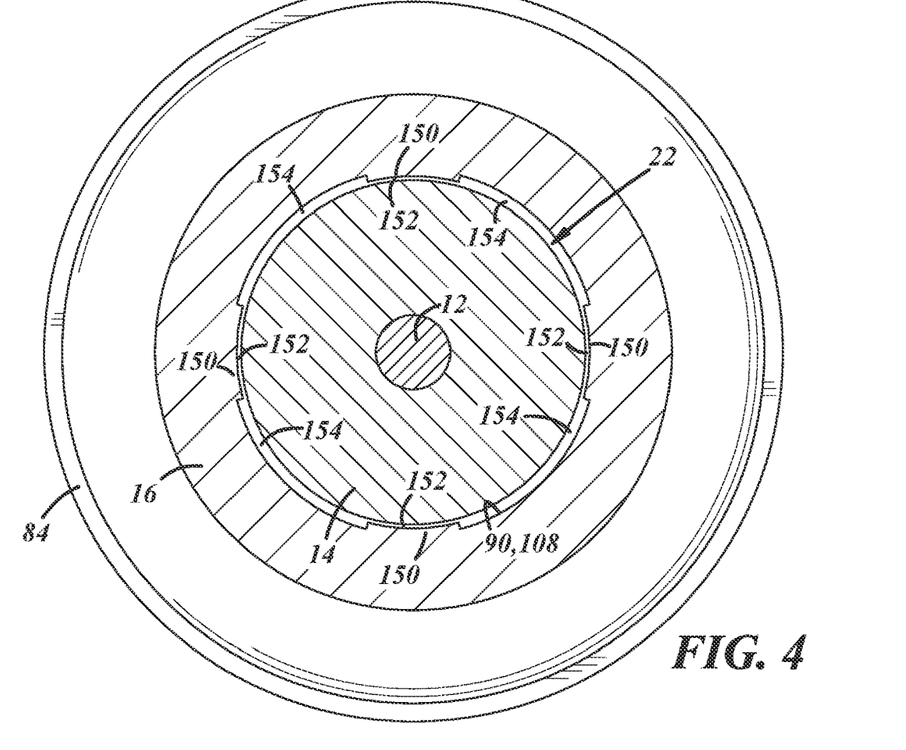
FIG. 4 is a cross-sectional view of the prechamber spark plug of FIG. 1 taken along line 4-4 in FIG. 1.

The flow passage portion 22 may include a series of projections 150 that are spaced around the circumference of the flow passage portion (e.g., FIG. 4 shows four projections 150 evenly spaced around the flow passage portion by about 90°). The projection(s) 150 may start at or near the unsupported exterior shoulder 72 of the insulator and extend axially upwards from there. Although the figures show four, evenly spaced projections 150 that are integral components of the shell 16 and project in a radially inward fashion, this is not mandatory. For instance, the flow passage portion 22 could include less than four projections (e.g., one, two or three projections) or more than four projections (e.g., five, six, seven, eight, ten, twelve, twenty projections, etc.). Furthermore, the projections 150 may be unevenly spaced around the circumference of the flow passage portion, as this can be beneficial in certain applications where the prechamber spark plug is installed in the engine on an angle or incline, such as installations in between valve bridges. The intentionally designed uneven spacing of the projections 150 can be used to offset or at least mitigate the effects that angled installations oftentimes have on the flow of residual exhaust gases. It is also possible for the projections 150 to be integrally formed with the insulator 14 such that they project radially outward towards a smooth interior shell surface 108, as opposed to being integrally formed with the shell, or some projections can be integrally formed with the shell while others are integrally formed with the insulator (e.g., half with the shell, half with the insulator). Preferably, the projections 150 are integrally formed on the shell interior surface 108, since it is typically easier to form them in a cold form extrusion or machining process (e.g., with the use of a wobble broach or straight broach) than it is to form them during manufacture of the insulator (e.g., by molding or additive manufacturing), but any of these embodiments are possible.

Figure 5:
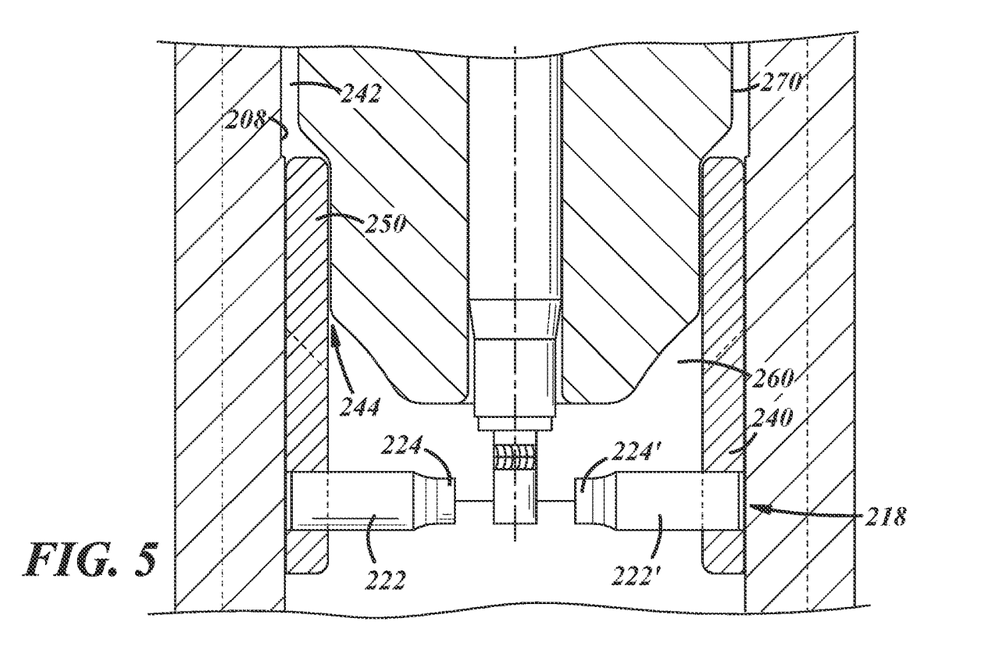
FIG. 5 is an enlarged cross-sectional view of a portion of a second example of the prechamber spark plug of FIG. 1, where the portion shows a sleeve component that includes projections that are part of a flow passage portion and that is part of a ground electrode assembly.

In yet another example illustrated in FIG. 5, the projections 250 are part of a separate or discrete sleeve component 240 (e.g., a stamped or machined metal sleeve or ring) that fits between the insulator exterior surface 270 and the shell interior surface 208. The interior surface of the sleeve component 240 may be fluted towards its upper axial end so that circumferentially spaced projections 250 create channels or passageways therebetween that fluidly connect an upper prechamber section 260 to a lower internal reservoir section 242, much like the projections and flow passage portions of the other embodiments. The sleeve component 240 may also extend axially downwards towards the firing end in order to act as part of a ground electrode assembly 218. In this example, the sleeve component 240 acts as a ground electrode ring and supports one or more ground electrode attachment pieces 222, 222' and ground electrode tips 224, 224', as described in the previous embodiment. Accordingly, the sleeve component 240 can have multiple purposes since its projections 250 are part of a flow passage portion 244 that fluidly connects the prechamber to the internal reservoir, and it also forms part of the ground electrode assembly 218. If the sleeve component 240 forms part of the ground electrode assembly 218, then it must be made from a suitable metal or other conductive material. Of course, other embodiments and variations of the sleeve component 240 are certainly possible, including ones where its projections 250 are part of the flow passage portion 244 but are not part of the ground electrode assembly 218, ones where it has integrally formed extensions that act as ground electrode tip(s) instead of separate tip components welded thereto, ones where the projections and/or passageways have different configurations, etc.

Turning back to FIG. 4, centering the insulator 14 within the axial bore 90 of the shell may be important for maintaining an adequate flow of residual exhaust gases into and/or out of the internal reservoir 20. The flow passage portion 22 may include a number of passageways 154, where each passageway 154 is located between two adjacent projections 150. Thus, the projections 150 and passageways 154 circumferentially extend around the flow passage portion 22 in alternating succession, as illustrated in FIG. 4 (each passageway 154 is circumferentially located between two projections 150; and each projection 150 is circumferentially located between two passageways 154). The projections 150 can act as centering features that help maintain the core nose section 58 centered in place and help establish a uniform radial spacing in the flow passage portion 22. The term "uniform radial spacing," as used herein in the context of the flow passage portion, means that when looking at a particular cross-sectional view, such as FIG. 4, the average radial width of any one passageway 154 is within 30% of the average radial width of another passageway 154. In some instances, a small gap or spacing 152 may exist between a surface of a projection 150 and an opposing insulator exterior surface 70, whereas in other instances these surfaces may contact one another. In those instances where a small radial gap 152 exists, the space or volume in gap 52 becomes part of the overall flow passage portion 22, as residual exhaust gases can flow through such a gap. It should be appreciated that the passageways 154 and/or projections 150 may have different configurations, arrangements, sizes and/ or shapes than those illustrated in the drawings and described herein. For example, instead of the passageways 154 extending solely or predominantly in an axial direction, like they do in the drawings where they connect the prechamber 24 to the internal reservoir 20, the passageways could include one or more passageway section(s) that extend in a radial direction, in an inclined or angled direction, in a circumferential direction, in a spiraled direction, or a combination thereof. In yet another embodiment, instead of the flow passage portion 22 having one or more discrete projections 150 and/or passageways 154, as shown in the drawings, the flow passage portion could simply include a segment where the interior surface 108 of the shell and the exterior surface 70 of the insulator come together in a tapering, converging and/or otherwise narrowing fashion. In such an embodiment, the flow passage portion would be a single annular passageway that is generally uniform around its circumference, and the amount of residual exhaust gases that are allowed to pass through would be somewhat dictated by the shape and size of that passageway. Other embodiments, including those without discrete projections and/or passageways, are possible and are within the scope of the present application.

In order for the flow passage portion 22 to provide the residual exhaust gases with adequate ingress and egress into and out of the internal reservoir 20, it may be preferable for the size of the flow passage portion 22 to be correlated to the size of the internal reservoir 20 and/or the size of openings in the prechamber cap 26. The total cross-sectional area of the flow passage portion 22 is referred to as AFC and is measured at the axial midpoint of the flow passage portion (see, for example, FIG. 2 which shows the cross-section of FIG. 4 being taken at the axial midpoint of the flow passage portion, as defined by projections 150). The total cross-sectional area AFC represents the sum of the cross-sectional areas of all the passageways 154 and all the gaps 152, measured in mm$^2$, when measured at the axial midpoint of the flow passage portion 22. The total volume of the internal reservoir 20 is referred to as VRES and represents the sum of the volumes of all of the internal reservoir sections, measured in mm$^3$ (in the example of FIG. 1, VRES equals the sum of the upper internal reservoir section 140 volume and the lower internal reservoir section 142 volume). According to several non-limiting examples, it is preferable for the ratio AFC:VRES to be greater than or equal to 0.015 (1/mm), that is the total cross-sectional area AFC of the flow passage portion 22 should be at least 1.5% of the total volume VRES of the internal reservoir 20; it is preferable for the ratio AFC:VRES to be less than or equal to 0.05 (1/mm), that is the total cross-sectional area AFC of the flow passage portion 22 should be no more than 5.0% of the total volume VRES of the internal reservoir 20; and it is even more preferable for the ratio of AFC:VRES to be from 0.015 to 0.05 (1/mm), inclusive, that is the total cross-sectional area AFC of the flow passage portion 22 should be between 1.5% and 5.0%, inclusive, of the total volume VRES of the internal reservoir 20.

The total cross-sectional area of all the openings 186 in the prechamber cap 26 (the openings and the prechamber cap are described below in greater detail) is referred to as AHMAX and represents the sum of the cross-sectional areas of all the openings 186 in the prechamber cap 26, measured in mm$^2$, when measured at the axial midpoint of each opening. For example, if there are six openings in the prechamber cap and each opening has a uniform diameter of 1.2 mm, then AHMAX for these openings is approximately 6.8 mm$^2$. If the size of an opening changes, such as when its chamfered at one or both ends, then the cross-sectional area at the axial midpoint of the opening should be used. According to several non-limiting examples, it is preferable for the ratio AFC:AHMAX to be greater than or equal to 0.30, that is the total cross-sectional area AFC of the flow passage portion 22 should be at least 30% of the combined cross-sectional area AHMAX of all of the openings 186; it is preferable for the ratio AFC:AHMAX to be less than or equal to 0.75, that is the total cross-sectional area AFC of the flow passage portion 22 should be no more than 75% of the combined cross-sectional area AHMAX of all of the openings 186; and it is even more preferable for the ratio AFC:AHMAX to be from 0.30 to 0.75, inclusive, that is the total cross-sectional area AFC of the flow passage portion 22 should be between 30% and 75%, inclusive, of the combined cross-sectional area AHMAX of all of the openings 186. It should be recognized that the spark plug of the present application is not limited to the aforementioned relationships, as these are provided here for exemplary purposes.

The prechamber 24 is in fluid communication with both the flow passage portion 22 and a main combustion chamber (not shown) and is designed so that a fresh air/fuel charge can enter the prechamber before ignition, while at the same time managing residual exhaust gases created during ignition. Proper flow velocity into and/or out of the prechamber 24, as well as the pressure at the spark gap G are just some of the design considerations that go into the design of the prechamber 24. With reference to FIGS. 1 and 2, the prechamber 24 may include an upper prechamber section 160 separated from a lower prechamber section 162 by the ground electrode assembly 18, although the two prechamber sections are still in significant fluid communication with one another.

The upper prechamber section 160 is a space or volume that is in fluid communication with both the flow passage portion 22 and the lower prechamber section 162 such that it may come into contact with fresh air/fuel charges, as well as residual exhaust gases. In the illustrated example, the upper prechamber section 160 may have a concave upper boundary (due to the insulator core nose) and is at least partially bounded by the flow passage portion 22 and the insulator core nose exterior surface 74 on an upper axial side, the ground electrode assembly 18 on a lower axial side, and the shell interior surface 108 on an outer radial side. The center electrode assembly 12 (complete with the center electrode tip 34) may extend completely through the upper prechamber section 160 such that it terminates at a location where it can oppose the ground electrode tips 124 and form spark gaps G, although this is not necessary.

The lower prechamber section 162 is a space or volume that is in fluid communication with the upper prechamber section 160 and a main combustion chamber (not shown) and is typically the main fluid conduit into and out of the prechamber 24. According to the non-limiting example shown in the drawings, the lower prechamber section 162 has a concave lower boundary (due to the prechamber cap) and is at least partially bounded by the ground electrode assembly 18 on an upper axial side, the prechamber cap 26 on a lower axial side, and the shell interior surface 108 on an outer radial side. The lower prechamber section 162 is typically larger volumetrically than the upper prechamber section 160, sometimes by a factor of 1.5×, 2.0×, 3.0× or even 4.0× larger. The center electrode assembly 12 is not shown extending into the lower prechamber section 162, but it could. As best seen in FIG. 1, both the upper and lower prechamber sections 160, 162 are located at axial positions that are aligned with the reduced section 86 of the shell, which is the threaded section.

The prechamber cap 26 is a separate metal piece that is attached to the shell 16 and helps delimit or define the prechamber 24. By providing a discrete prechamber cap 26 that can be welded to the shell 16, as opposed to it being an integral extension of the shell, one can customize the material, size and/or shape of the cap to achieve various thermal and/or wear requirements of the application. For instance, it is possible for the prechamber cap 26 to be made from a nickel-based material, such as Inconel 600, 601 or some other nickel-based alloy, or possibly even a copper-based material. According to the non-limiting example shown in FIG. 1, the prechamber cap 26 includes an interior surface 180, an exterior surface 182, an attachment surface 184 and one or more openings 186 that provide fluid access between the prechamber 24 and the main chamber. The interior surface 180 is exposed to the lower prechamber section 162 and can be concave or any other suitable shape. The exterior surface 182 is exposed to the main combustion chamber and, depending on the particular engine, may be contoured in such a way to interact with the main chamber. Attachment surface 184 contacts the shell 16 and may be important in terms of how the prechamber cap 26 is fastened to the shell and/or how the prechamber cap transfers thermal energy to the shell. For example, attachment surface 184 may extend for such a distance that a substantial metal-to-metal contact is established with the interior surface 108; this can help facilitate thermal conductivity or transfer from the cap to the shell. It may be desirable to select a material for the prechamber cap 26 that has a rate of thermal expansion (RTE) that is greater than that of the shell 16; this way, during operation when the temperatures inside the prechamber 24 heat up, the prechamber cap can expand against the interior surface 108 and increase the strength of the bond holding the prechamber cap in place. If the shell has a shell extension, like short extension 192, a laser or other weld can be used to secure the prechamber cap 26 to the shell 16. It is usually preferable for such a weld to completely penetrate through the shell extension 192, through the attachment surface 184 and into the cap, but without going all the way through the cap. When the prechamber cap 26 is attached to the shell 16, the rotational position of the cap may be set or predetermined so that the openings 186 are rotationally indexed or clocked, with respect to the spark gap(s), the ground electrode assembly 18, the thread helix and/or other features. The openings 186, which can vary in number, size, orientation and/or location, can also be customized to fit the needs of a particular main chamber, engine and/or application and are not limited to the examples shown in the drawings. For example, the openings or holes 186 may be of multiple sizes or angles on the same prechamber cap to optimize ignition in the main chamber at different operating conditions. According to a non-limiting example, there are between two and eight openings, inclusive, and even more preferably between four and six openings, inclusive. Other embodiments are certainly possible.

Figure 6:
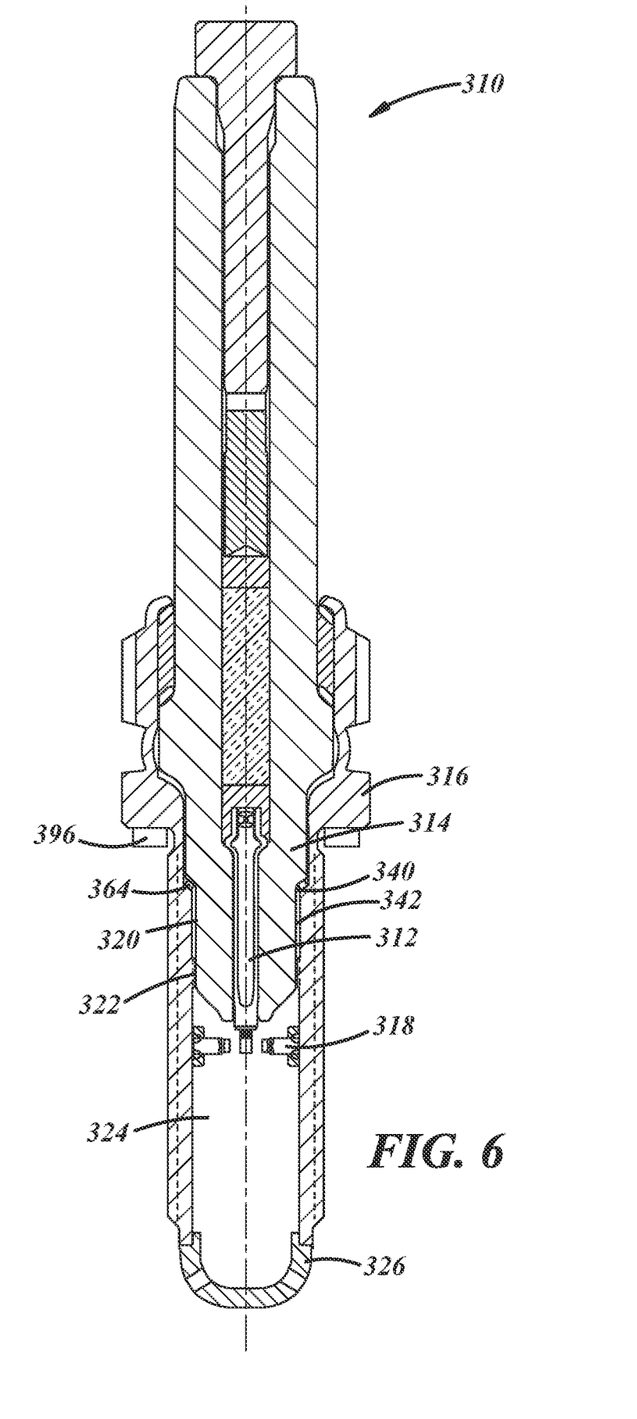
FIG. 6 is a cross-sectional view of a third example of a prechamber spark plug, where the internal reservoir is shorter than the previous examples.

With reference to FIG. 6, there is shown another embodiment of a prechamber spark plug 310 having a center electrode assembly 312, an insulator 314, a shell 316, a ground electrode assembly 318, an internal reservoir 320, a flow passage portion 322, a prechamber 324 and a prechamber cap 326. This embodiment is largely the same as those previous described, except that the internal reservoir 320 is shorter in axial length such that its upper axial end is bounded by an annular internal seal 364 that is located below an annular external gasket 396, instead of being located above such a gasket like it is in FIG. 1. In this embodiment, the internal reservoir 320 may include both an upper internal reservoir section 340 and a lower internal reservoir section 342, however, the upper section 340 is substantially smaller than its counterpart in the FIG. 1 embodiment. The annular internal seal 364 (internal seal), according to this example, is at least partially axially located between the annular external gasket 396 (external seal) and the internal reservoir 320 and helps create a significant thermal pathway for transferring heat from the spark plug to the engine, as explained above.

During manufacture, the ground electrode assembly 18 is inserted into the shell axial bore 90 from the prechamber cap end 88, as that end is open before the prechamber cap 26 is attached. Those skilled in the art will appreciate that the position and/or size of the spark gap(s) G can have a significant impact on the stability of the cycle-to-cycle variation in the ignition and/or combustion events. According to one example, the ground electrode assembly 18 is "freely positioned" within the axial bore 90 of the shell 16 so that the accuracy of the spark gap G position and size can be improved. Improving the accuracy of the spark gap G in this way can enhance the stability of the ignition and/or combustion events, even if there are design or production related variations in the position of the center electrode assembly 12. The term "freely positioned," as used herein, means that the ground electrode assembly 18 is configured for attachment within the shell axial bore 90 at any number of potential axial and circumferential positions in order to set the position and size of one or more spark gap(s) G with the center electrode assembly 12. To explain, the interior surface 108 of the shell axial bore 90 preferably has a generally smooth and uniform inner diameter (ID) in the area of the spark gap G such that ground electrode assembly 18 may be slid up into the bore 90 during manufacture and positioned at any number of possible axial positions, depending on the location of the center electrode assembly 12. This axial freedom enables the manufacturing process to address tolerances and other variations in the axial position of the center electrode assembly 12, and also enables the designer to adjust the relative volumes of the upper and lower prechamber sections 160, 162, as the boundary between these sections is set by the position of the ground electrode assembly 18. Similarly, the ground electrode assembly 18 can be rotated, during manufacture, within the shell axial bore 90 in the area of the spark gap G in order to assume any number of different circumferential positions. In the event that components of the center electrode assembly 12, the ground electrode assembly 18 and/or the shell axial bore 90 are slightly out of dimension or lack perfect concentricity, this circumferential freedom enables the manufacturing process to rotate the ground electrode assembly 18 while evaluating the size of the different spark gap(s) G until a desirable circumferential position is obtained. For example, the manufacturing process could use a vision or other sensor system to monitor the size of the different spark gap(s) Gas the ground electrode assembly 18 is experiencing relative rotation, with respect to the shell 16 (assembly 18 could be rotated, shell 16 could be rotated or both could be rotated). When a desirable axial and/or circumferential position is found (e.g., one that distributes radial tolerances evenly across multiple spark gaps G), the manufacturing process can laser weld, resistance weld and/or otherwise attach the ground electrode ring 120 to the shell 16. In the preceding example of a freely positioned ground electrode assembly, neither the ground electrode assembly 18 nor the shell axial bore 90 have any mechanical features, such as stops or shoulders, that prevent the axial and circumferential freedoms described. Other arrangements and embodiments are certainly possible.

After the ground electrode assembly 18 has been adjusted and attached within the shell axial bore, the prechamber cap 26 can be properly positioned and attached to the end of the shell (e.g., at the prechamber cap end 88). As indicated above, since the prechamber cap 26 is a separate piece from the shell 16, as opposed to being an integral extension of the shell, it affords the designer more freedom in terms of selecting a prechamber cap made from certain materials with certain thermal characteristics, in terms of allowing asymmetric caps that are indexed to the thread start 104 or other features of the spark plug, as well as to possibly optimize the prechamber cap 26 in terms of complex shapes and configurations. Once selected and properly positioned, the prechamber cap 26 may be laser or otherwise welded to the shell at shell extension 192. Other configurations and embodiments are certainly possible.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A prechamber spark plug, comprising:
a center electrode assembly;
an insulator including an axial bore, the center electrode assembly is at least partially accommodated within the insulator axial bore;
a shell including an axial bore, the insulator is at least partially accommodated within the shell axial bore;
a ground electrode assembly, the ground electrode assembly forms one or more spark gap(s) with the center electrode assembly and is attached to the shell;
an internal reservoir, the internal reservoir is a space that is disposed radially between the insulator and the shell and is configured to receive residual exhaust gases;
a flow passage portion including one or more projection(s), the flow passage portion is in fluid communication with the internal reservoir and is configured to affect a flow of the residual exhaust gases into and/or out of the internal reservoir;
a prechamber, the prechamber is in fluid communication with the flow passage portion and a main combustion chamber, the prechamber surrounds the spark gap(s) and is configured to exchange fresh air/fuel gases and the residual exhaust gases with the main combustion chamber; and
a prechamber cap including one or more opening(s), the prechamber cap is attached to the shell.

2. The prechamber spark plug of claim 1, wherein the insulator includes a terminal end, an enlarged section, a reduced section, a core nose section, and a free end,
the enlarged section is located between the terminal end and the reduced section;
the reduced section is located between the enlarged section and the free end;
the core nose section is located between the reduced section and the free end;
a first insulator exterior shoulder is formed at a transition between the enlarged section and the reduced section, the first insulator exterior shoulder is supported on an annular internal seal which, in turn, is supported on a first shell interior shoulder; and
a second insulator exterior shoulder is formed at a transition between the reduced section and the core nose section, the second insulator exterior shoulder is not supported on an annular seal or a shell interior shoulder such that it is an unsupported shoulder, and the unsupported shoulder helps establish a thermal pathway for residual exhaust gases through the annular internal seal and the first shell interior shoulder which are in the area of an upper internal reservoir section.

3. The prechamber spark plug of claim 2, wherein the core nose section includes an exterior surface that is slightly concaved such that a small pocket is formed that can affect a flow of residual and/or other gases in an upper prechamber section.

4. The prechamber spark plug of claim 1, wherein the shell includes a crimped end, an enlarged section, a reduced section, and a prechamber cap end,
the enlarged section is located between the crimped end and the reduced section;
the reduced section is located between the enlarged section and the prechamber cap end and includes threads for installation in an engine, the reduced section has a long reach with a large axial length F that is at least 19 mm; and
a shell exterior shoulder is formed at a transition between the enlarged section and the reduced section, and the shell exterior shoulder is designed to compress an annular external gasket between the shell exterior shoulder and a part of the engine when the prechamber spark plug is installed in the engine.

5. The prechamber spark plug of claim 1, wherein the ground electrode assembly includes a ground electrode ring, one or more ground electrode attachment piece(s), and one or more ground electrode tips,
the ground electrode ring is attached to the interior surface of the shell axial bore and includes one or more recess(es);
the ground electrode attachment piece(s) are received in the recess(es) and extend in a generally radially inward manner from the ground electrode ring towards the center electrode tip; and
the ground electrode tip(s) are attached to the ground electrode attachment piece(s) and form spark gap(s)

with the center electrode assembly, and the ground electrode tip(s) include a precious metal-based material.

6. The prechamber spark plug of claim 5, wherein the ground electrode ring includes a slight annular taper on an outer diameter surface to ease insertion of the ground electrode ring into the shell axial bore, and the ground electrode assembly includes one or more small gap(s) between axial end surface(s) of the ground electrode attachment piece(s) and an inner diameter surface of the shell axial bore.

7. The prechamber spark plug of claim 1, wherein the internal reservoir includes an upper internal reservoir section and a lower internal reservoir section,
   the upper internal reservoir section is generally an annular space that is in fluid communication with the lower internal reservoir section; and
   the lower internal reservoir section is generally a cylindrical space that is in fluid communication with both the upper internal reservoir section and the flow passage portion.

8. The prechamber spark plug of claim 7, wherein the upper internal reservoir section is at least partially bounded or defined by: an annular internal seal on an upper axial side, a second shell interior shoulder on a lower axial side, an exterior surface of the insulator on an inner radial side, and the interior surface of the shell axial bore on an outer radial side, the upper internal reservoir section is shorter in axial length and is wider in radial width than the lower internal reservoir section.

9. The prechamber spark plug of claim 7, wherein at least part of the upper internal reservoir section is located directly adjacent an enlarged section of the shell, which is in contact with an annular external gasket such that, when the prechamber spark plug is installed in an engine, a thermal pathway is established that transfers thermal energy from hot residual exhaust gases in the upper internal reservoir section to the shell enlarged section, and from the shell enlarged section to the engine via the annular external gasket.

10. The prechamber spark plug of claim 7, wherein the lower internal reservoir section is at least partially bounded or defined by: a second shell interior shoulder on an upper axial side, the flow passage portion on a lower axial side, an exterior surface of the insulator on an inner radial side, and the interior surface of the shell axial bore on an outer radial side.

11. The prechamber spark plug of claim 1, wherein the projection(s) of the flow passage portion have a configuration that is selected from the group consisting of: the projection(s) are integrally formed with the shell and project radially inwards toward the insulator, the projection(s) are integrally formed with the insulator and project radially outwards toward the shell, some of the projection(s) are integrally formed with the shell and project radially inwards toward the insulator while other projection(s) are integrally formed with the insulator and project radially outwards toward the shell, or the projection(s) are part of a separate sleeve component that fits radially between the insulator and the shell.

12. The prechamber spark plug of claim 11, wherein the projection(s) are integrally formed with the shell and project radially inwards toward the insulator, the flow passage portion further includes one or more small gap(s), each small gap is located radially between an opposing surface of a projection and an exterior surface of the insulator such that the projection and the insulator do not contact one another at that small gap.

13. The prechamber spark plug of claim 1, wherein the projection(s) of the flow passage portion are part of a separate sleeve component that is at least partially located between the shell and the insulator and extends axially so as to also be part of the ground electrode assembly.

14. The prechamber spark plug of claim 1, wherein the flow passage portion is at least partially bounded or defined by: a lower internal reservoir section on an upper axial side, an upper prechamber section on a lower axial side, an exterior surface of the insulator on an inner radial side, and the interior surface of the shell axial bore on an outer radial side, the projection(s) of the flow passage portion help center the insulator within the axial bore of the shell such that a uniform radial spacing is maintained in the flow passage portion.

15. The prechamber spark plug of claim 1, wherein the flow passage portion has a total cross-sectional area (AFC) measured in mm$^2$ and the internal reservoir has a total volume (VRES) measured in mm$^3$, and the ratio AFC:VRES is greater than or equal to 0.015 (1/mm).

16. The prechamber spark plug of claim 1, wherein the flow passage portion has a total cross-sectional area (AFC) measured in mm$^2$ and the opening(s) in the prechamber cap have a total cross-sectional area (AHMAX) measured in mm$^2$, and the ratio AFC:AHMAX is greater than or equal to 0.30.

17. The prechamber spark plug of claim 1, wherein the prechamber includes an upper prechamber section and a lower prechamber section,
   the upper prechamber section is a space that is located axially above the ground electrode assembly and is in fluid communication with both the flow passage portion and the lower prechamber section; and
   the lower prechamber section is a space that is located axially below the ground electrode assembly and is in fluid communication with both the upper the upper prechamber section and a main combustion chamber.

18. The prechamber spark plug of claim 1, wherein the ground electrode assembly is freely positioned with the shell axial bore.

19. The prechamber spark plug of claim 18, wherein the ground electrode assembly and the shell axial bore are configured so that, during manufacture, an axial position of the ground electrode assembly can be adjusted by sliding the ground electrode assembly within the shell axial bore before attachment and a circumferential position of the ground electrode assembly can be adjusted by rotating the ground electrode assembly within the shell axial bore before attachment.

20. A method of manufacturing a prechamber spark plug,
   the prechamber spark plug comprises: a center electrode assembly; an insulator including an axial bore, the center electrode assembly is at least partially accommodated within the insulator axial bore; a shell including an axial bore and a prechamber cap end, the insulator is at least partially accommodated within the shell axial bore; a ground electrode assembly; an internal reservoir, the internal reservoir is a space that is disposed radially between the insulator and the shell; a flow passage portion including one or more projection(s), the flow passage portion is in fluid communication with the internal reservoir; a prechamber, the prechamber is in fluid communication with the flow passage portion and a main combustion chamber; and a prechamber cap including one or more opening(s), the prechamber cap is attached to the shell;

the method comprises the steps of:
  inserting the ground electrode assembly into the shell axial bore from the prechamber cap end so that the ground electrode assembly is freely positioned within the shell axial bore;
  adjusting the ground electrode assembly within the shell axial bore in terms of at least one of its axial position and/or its circumferential position; and
  attaching the ground electrode assembly to the shell when a desirable axial position and/or circumferential position is set.

* * * * *

UNITED STATES PATENT AND TRADEMARK OFFICE
CERTIFICATE OF CORRECTION

PATENT NO. : 11,757,262 B1
APPLICATION NO. : 18/089777
DATED : September 12, 2023
INVENTOR(S) : James D. Lykowski et al.

It is certified that error appears in the above-identified patent and that said Letters Patent is hereby corrected as shown below:

In the Specification

Column 4, Line 45 and 46: replace "....is in fluid communication with both the upper the upper prechamber..." with "....is in fluid communication with both the upper prechamber....."

Column 16, Line 61: replace "....Gas the ground electrode assembly...." with "G as the ground electrode assembly"

In the Claims

Claim 17, Column 20, Line 38-40: replace "....is in fluid communication with both the upper the upper prechamber..." with "....is in fluid communication with both the upper prechamber....."

Signed and Sealed this
Nineteenth Day of December, 2023

Katherine Kelly Vidal
*Director of the United States Patent and Trademark Office*